(12) United States Patent
Yamada

(10) Patent No.: US 11,047,444 B2
(45) Date of Patent: Jun. 29, 2021

(54) DAMPING STOPPER

(71) Applicant: NOK CORPORATION, Tokyo (JP)

(72) Inventor: Suguru Yamada, Tottori (JP)

(73) Assignee: NOK CORPORATION, Tokyo (JP)

( * ) Notice: Subject to any disclaimer, the term of this patent is extended or adjusted under 35 U.S.C. 154(b) by 0 days.

(21) Appl. No.: 16/083,667

(22) PCT Filed: Mar. 7, 2017

(86) PCT No.: PCT/JP2017/008874
§ 371 (c)(1),
(2) Date: Sep. 10, 2018

(87) PCT Pub. No.: WO2017/154857
PCT Pub. Date: Sep. 14, 2017

(65) Prior Publication Data
US 2019/0078638 A1 Mar. 14, 2019

(30) Foreign Application Priority Data
Mar. 11, 2016 (JP) .............................. JP2016-047812

(51) Int. Cl.
*F16F 1/373* (2006.01)
*F16F 1/44* (2006.01)
(Continued)

(52) U.S. Cl.
CPC .............. *F16F 1/3735* (2013.01); *B62D 3/02* (2013.01); *F16F 1/3605* (2013.01);
(Continued)

(58) Field of Classification Search
CPC .......... B62D 3/02; B62D 3/12; B62D 5/0403; B62D 7/163; B62D 7/228; F16F 1/3605;
(Continued)

(56) References Cited

U.S. PATENT DOCUMENTS 6,796,159 B2 * 9/2004 Kelm ..................... B21D 24/02
72/351
7,818,988 B2 * 10/2010 Runesson ............... F16F 1/445
72/351
(Continued)

FOREIGN PATENT DOCUMENTS

CN 1558849 12/2004
EP 1188586 * 3/2002
(Continued)

OTHER PUBLICATIONS

Official Communication issued in European Patent Office (EPO) Patent Application No. 17763197.5, dated Feb. 28, 2019.
(Continued)

*Primary Examiner* — Vishal R Sahni
(74) *Attorney, Agent, or Firm* — Greenblum & Bernstein, P.L.C.

(57) ABSTRACT

Damping stopper for a mechanism in which a housing and shaft are not only displaced axially relative to each other but but also rotated relative to each other. The damping stopper is attached to a space portion between an end surface portion on housing side and an end surface portion on shaft side which is displaced axially relative to the housing and is rotated relative to the housing and has a metal fitting on one of the end surface portions, an elastic body connected to the metal fitting, and a sliding member connected to the elastic body. The sliding member contacts the other end surface portion to contact/separate from the other end surface portion and the sliding member is slidable and rotatable relative to the other end surface portion when the shaft is rotated while the sliding member, containing resin component, contacts the other end surface portion.

11 Claims, 2 Drawing Sheets

(51) Int. Cl.
*B62D 3/02* (2006.01)
*F16F 1/36* (2006.01)
*F16F 1/371* (2006.01)
*F16F 1/38* (2006.01)

(52) U.S. Cl.
CPC ............ *F16F 1/3615* (2013.01); *F16F 1/371* (2013.01); *F16F 1/3732* (2013.01); *F16F 1/3814* (2013.01); *F16F 1/44* (2013.01); *F16F 2224/025* (2013.01); *F16F 2236/045* (2013.01)

(58) Field of Classification Search
CPC ........ F16F 1/3615; F16F 1/371; F16F 1/3732; F16F 1/3814; F16F 1/44; F16F 1/3735; F16F 2224/025; F16F 2236/045; F16C 11/0652; F16C 2326/24
See application file for complete search history.

(56) References Cited

U.S. PATENT DOCUMENTS

| | | | | |
|---|---|---|---|---|
| 8,925,939 | B2* | 1/2015 | Ohashi | B62D 3/12 280/93.514 |
| 9,573,615 | B2* | 2/2017 | Schaumann | B62D 3/12 |
| 10,611,404 | B2* | 4/2020 | Ohashi | F16F 1/445 |
| 2005/0167182 | A1* | 8/2005 | Abe | B62D 5/0403 180/444 |
| 2009/0039574 | A1* | 2/2009 | Cook | F16F 1/3713 267/3 |
| 2012/0111132 | A1* | 5/2012 | Schaumann | B62D 3/12 74/29 |

FOREIGN PATENT DOCUMENTS

| | | | |
|---|---|---|---|
| EP | 1500573 | * | 1/2005 |
| EP | 1777138 | * | 4/2007 |
| JP | 55-20928 | | 2/1980 |
| JP | 61-206835 | | 9/1986 |
| JP | 2001280388 | * | 10/2001 |
| JP | 2009-12663 | | 1/2009 |
| JP | 4255832 | | 2/2009 |
| JP | 2011-002010 | | 1/2011 |
| JP | 2016-8003 | | 1/2016 |
| WO | 2006/038855 | | 4/2006 |
| WO | WO2014092630 | * | 6/2014 |

OTHER PUBLICATIONS

Official Communication issued in International Bureau of WIPO Patent Application No. PCT/JP2017/008874, dated May 9, 2017.
Office Action issued in China Counterpart Patent Appl. No. 201780008159.X, dated Apr. 30, 2019.

* cited by examiner

DAMPING STOPPER

BACKGROUND OF THE INVENTION

Field of the Invention

The present invention relates to a damping stopper having both a damping function and a stopper function. The damping stopper of the present invention is installed in a steering device and the like in the field of automobile equipment, for example, or used in the field of industrial equipment and the like.

Description of the Conventional Art

Heretofore, a damping stopper 51 illustrated in FIG. 2 is known. The damping stopper 51 is attached to a space portion between an end surface portion 63 provided on housing 61 side and an end surface portion 73 provided on shaft 71 side and contains a combination of a metal fitting 52 held on the end surface portion 73 on the shaft 71 side and an elastic body 53 connected to the metal fitting 52. The shaft 71 is displaced axially relative to the housing 61. The elastic body 53 contacts the end surface portion 63 on the housing 61 side so as to be able to contact/separate from the end surface portion 63.

When the shaft 71 is displaced axially relative to the housing 61 in the state of FIG. 2 in a direction where the interval between the end surface portions 63 and 73 narrows, the elastic body 53 is compressed, so that the damping function accompanying the compression and deformation is exhibited. When the compression and deformation of the elastic body 53 reaches the limit, the displacement stops, so that the stopper function is exhibited.

PRIOR ART DOCUMENT

Patent Documents

Patent Document 1: Japanese Patent No. 4255832

SUMMARY OF THE INVENTION

Problem to be Solved by the Invention

However, there is concern in the damping stopper 51 of the above-described configuration that, when the elastic body 53 is compressed and deformed, the elastic body 53 is caught in a gap c between the housing 61 and the metal fitting 52 to be broken.

In order to prevent the breakage due to the catching of the elastic body 53, it is considered that a metal fitting 54 is connected also to the tip side of the elastic body 53, so that the elastic body 53 is compressed and deformed between the pair of metal fittings 52 and 54 as illustrated in FIG. 3 as an reference example, in the example of FIG. 3, the damping stopper 51 is fixed to the housing 61 side, and, when the shaft 71 is displaced, the end surface portion 73 on the shaft 71 side collides with the metal fitting 54.

However, the metal fitting 54 has high friction in view of the material, and thus is hard to smoothly slide relative to the end surface portion 73 on the shaft 71 side.

Therefore, when the damping stopper 51 of FIG. 3 is used in a mechanism in which the housing 61 and the shaft 71 are rotated relative to each other, there is a possibility that a twist occurs in the elastic body 53 because the metal fitting 54 does not smoothly slide, so that the elastic body 53 may be broken by the twist.

Therefore, the use of the damping stopper 51 of FIG. 3 is limited to a mechanism in which the housing 61 and the shaft 71 are displaced axially relative to each other and cannot be used in a mechanism in which the housing 61 and the shaft 71 are displaced axially relative to each other and are rotated relative to each other.

In view of the above-described points, it is an object of the present invention to provide a damping stopper which can be used not only in a mechanism in which a housing and a shaft are displaced axially relative to each other but in a mechanism in which a housing and a shaft are displaced axially relative to each other and are rotated relative to each other.

Means for Solving the Problem

In order to achieve the object, a damping stopper of the present invention is attached to a space portion between an end surface portion provided on housing side and an end surface portion provided on shaft side which is displaced axially relative to the housing and is rotated relative to the housing and has a metal fitting held on one of the end surface portions, an elastic body connected to the metal fitting, and a sliding member connected to the elastic body, in which the sliding member contacts the other end surface portion so as to be able to contact/separate from the other end surface portion and the sliding member is slidable and rotatable relative to the other end surface portion when the shaft is rotated in a state where the sliding member contacts the other end surface portion.

In order to prevent the occurrence of a twist in the elastic body when the shaft is rotated relative to the housing, a situation may be created in which the rotation torque of the shaft is hard to be transmitted to the elastic body when the damping stopper is attached to the housing side, and a situation may be created in which the elastic body is easily rotated together with the shaft when the damping stopper is attached to the shaft side. Therefore, the present invention is configured so that the sliding member is connected to the elastic body and the sliding member is brought into contact with a mating component (shaft or housing) from such a viewpoint.

More specifically, when the damping stopper is attached to the housing side, the sliding member contacts the shaft side to relatively slide and rotate. Therefore, a situation is created in which the rotation torque of the shaft is hard to be transmitted to the elastic body.

When the damping stopper is attached to the shaft side, the sliding member contacts the housing side to slide and rotate. Therefore, a situation is created in h the elastic body is easily rotated together with the shaft.

The sliding member is preferably one containing a resin component having low friction as compared with a metal fitting.

Effect of the Invention

The present invention can provide a damping stopper which can be used not only in a mechanism in which a housing and a shaft are displaced axially relative to each other but in a mechanism in which a housing and a shaft are displaced axially relative to each other and are rotated relative to each other because a sliding member is connected to an elastic body.

DETAILED DESCRIPTION OF PREFERRED EMBODIMENTS

The present invention includes the following embodiments.

(1) In the present invention, materials (for example, polyacetal, polyamide, and the like) slidable with low friction are applied as a substituent for a conventional metal ring so as to enable the sliding with a mating component, and thus the present invention can be applied to a mechanism in which a housing and a shaft are rotated relative to each other.

(2) The present invention can achieve energy absorption or a hitting sound reduction when a mating component collides or vibrates also in a mechanism in which a housing and a shaft are rotated relative to each other.

(3) The present invention has performance capable of absorbing/reducing the energy or the vibration also in a mechanism in which a housing and a shaft are rotated relative to each other by applying a material slidable with low friction to a ring in a damping stopper containing an elastic body. Moreover, it will enable a reduction in energy and vibration not only for simple input in the axial direction or the rotation direction but for composite input.

EXAMPLES

Hereinafter, examples of the present invention are described with reference to the drawings.

Figure 1A:
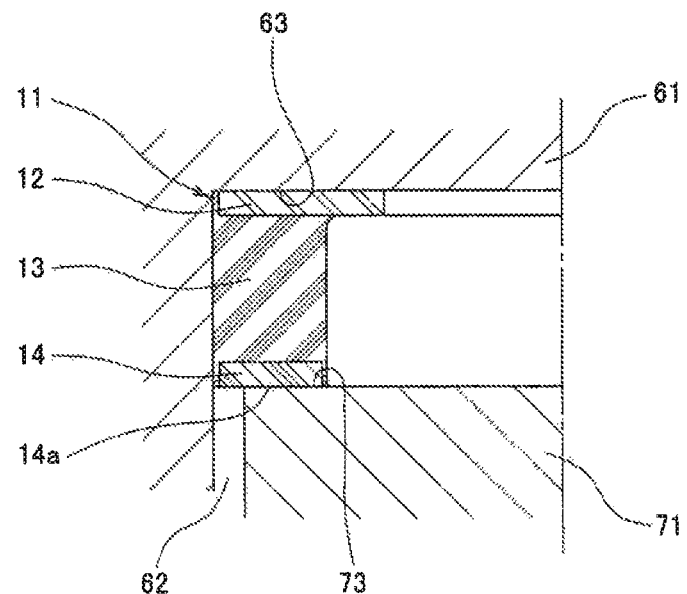
FIGS. 1A and 1B are cross-sectional views illustrating states where a damping stopper according to an example of the present invention is attached and operates.

As illustrated in FIG. 1A, a damping stopper 11 according to this example is attached to a space portion between an end surface portion 63 provided in a deep end portion of a shaft hole 62 of a housing 61 and an end surface portion 73 provided in a tip portion of a shaft 71 which is passed through the shaft hole 62 and is displaced and rotated axially relative to the housing 61.

The damping stopper 11 has a plate-shaped annular metal fitting 12 fixed to the housing 61 and held on the end surface portion 63 on the housing 61 side, an annular elastic body 13 connected to the metal fitting 12 and containing a rubber-like elastic body, and a sliding member 14 connected to the elastic body 13.

The sliding member 14 is formed into an annular shape by a resin component having low friction as compared with a metal fitting. As specific examples of resin materials, polyacetal, polyimide, or the like can be mentioned. The sliding member 14 contacts the shaft 71 so as to be able to contact/separate from the shaft 17 and the sliding member 14 is smoothly slidable and rotatable relative to the shaft 71 when the shaft 71 is rotated in a state where the sliding member 14 contacts the shaft 71. Therefore, the sliding member 14 has a plate-shaped end surface 14a which is perpendicular to the axis, and freely to contact and slide on the end surface portion 73 on the shaft 71 side.

Figure 1B:
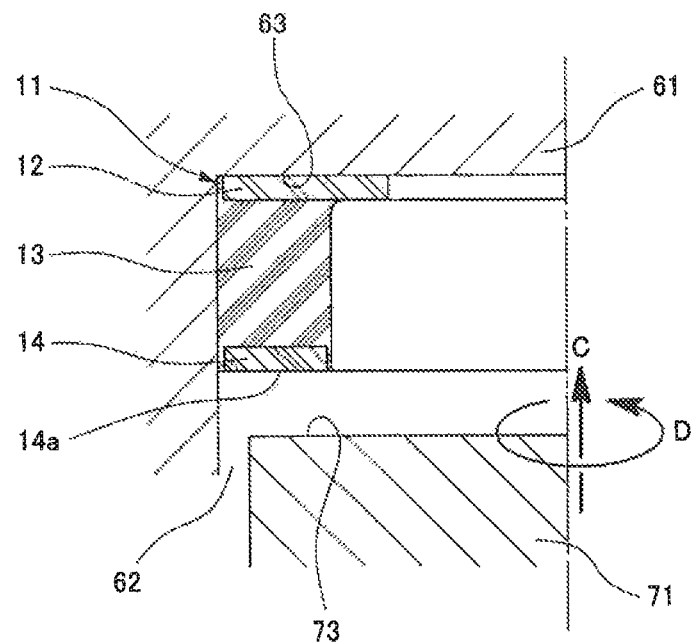
Figure 2:
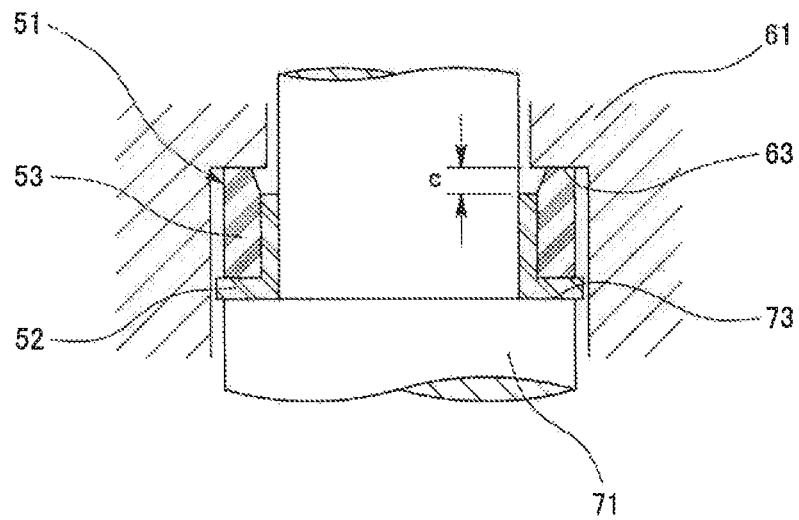
FIG. 2 is a cross-sectional view of a damping stopper according to a conventional example.
Figure 3:
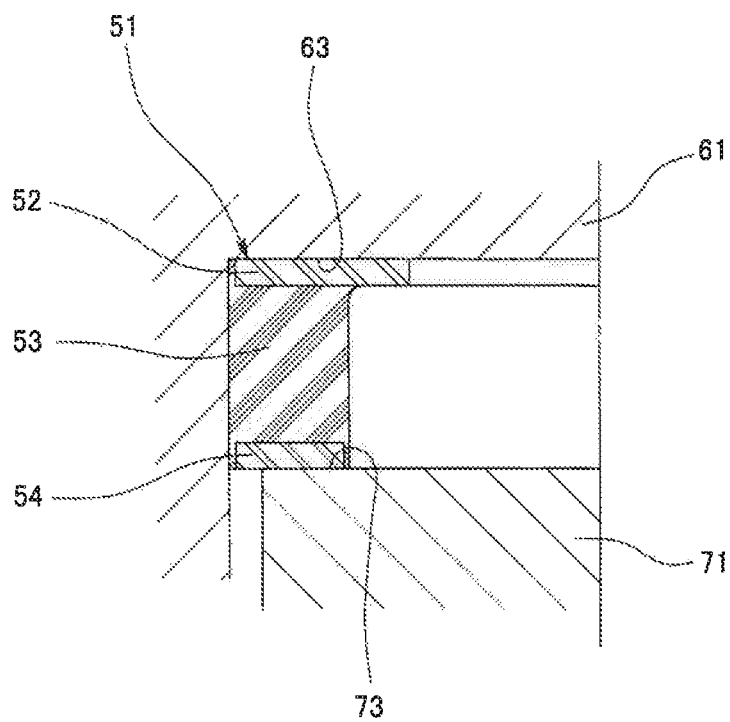
FIG. 3 is a cross-sectional view of a damping, stopper according to a reference example.

When the shaft 71 is displaced axially (arrow C) relative to the housing 61 in a state where the damping stopper 11 of the above-described configuration is attached to the housing 61 side as illustrated in FIG. 1B, the sliding member 14 contacts the end surface portion 73 on the shaft 71 side as Illustrated in FIG. 1A, the elastic body 13 is compressed, and then reaction force is generated, whereby the damping function is exhibited. When the compression of the elastic body 13 reaches the limit, the stopper function (mechanical stopper function) is exhibited, so that the displacement of the shaft 71 stops.

When the shaft 71 is rotated (arrow D) during the displacement or after the displacement of the shaft 71, the rotation torque is transmitted to the sliding member 14 from the shaft 71 but the sliding member 14 smoothly slides and rotates relative to the shaft 71. Therefore, a twist does not occur in the elastic body 13, and thus the occurrence of breakage and a durability reduction due to the occurrence of the twist in the elastic body 13 can be prevented.

As an attachment structure of the damping stopper 11, the damping stopper 11 may be fixed to the shaft 71 side and, more specifically, the damping stopper 11 may have the plate-shaped annular metal fitting 12 fixed to the shaft 71 and held on the end surface portion 73 on the shaft 71 side, the annular elastic body 13 connected to the metal fitting 12 and containing a rubber-like elastic body, and the sliding member 14 connected to the elastic body 13.

DESCRIPTION OF REFERENCE NUMERALS 11 damping stopper
12 metal fitting
13 elastic body
14 sliding member
14a end surface
61 housing
62 shaft hole
63, 73 end surface portion
71 shaft

What is claimed is:

1. A damping stopper which is attached to a space portion between an end surface portion provided on a side of a housing and an end surface portion provided on a side of a shaft, wherein the shaft is displaceable axially relative to the housing and is rotatable relative to the housing, the damping stopper comprising:
   a metal fitting held on a first one of the end surface portions;
   an elastic body connected to the metal fitting; and
   a slide structure connected to the elastic body, wherein
   the slide structure is entirely flat plate-shaped,
   the slide structure is contactable with and separable from a second one of the end surface portions, and the slide structure is slidable and rotatable relative to the second one of the end surface portions when the shaft is rotated in a state where the slide structure contacts the second one of the end surface portions,
   a portion of the elastic body does not overlap with the metal fitting in an axial direction of the shaft,
   the slide structure includes a through hole, and
   a surface of the elastic body is disposed inside the through hole of the slide structure.

2. The damping stopper according to claim 1, wherein the slide structure contains a resin component.

3. The damping stopper according to claim 2, wherein the resin component is one of polyacetal, polyamide, and polyimide.

4. The damping stopper according to claim 1, wherein the damper stopper is disposed inside a shaft hole in the housing that is to receive the shaft.

5. The damping stopper according to claim 1, wherein the metal fitting is plate-shaped and includes an annular ring shape with a through hole.

6. The damping stopper according to claim 1, wherein the slide structure includes an annular ring shape with the through hole.

7. The damping stopper according to claim 1, wherein the metal fitting is plate-shaped and includes an annular ring shape with a through hole,
the slide structure includes an annular ring shape with the through hole of the slide structure, and
an inner end of the metal fitting projects radially inwardly relative to an inner end of the slide structure so that the inner end of the metal fitting does not overlap with the slide structure in an axial direction of the shaft.

8. The damping stopper according to claim 1, wherein the portion of the elastic body does not overlap with the slide structure in the axial direction of the shaft.

9. The damping stopper according to claim 1, wherein the first one of the end surface portions is the end surface portion provided on the side of the housing, and
the second one of the end surface portions is the end surface portion provided on the side of the shaft.

10. The damping stopper according to claim 1, wherein a part of the elastic body is not aligned with the metal fitting in the axial direction of the shaft.

11. A damping stopper assembly, comprising:
a housing;
a shaft; and
a damper stopper that is attached to a space portion between an end surface portion provided on a side of the housing and an end surface portion provided on a side of the shaft, wherein
the shaft is displaceable axially relative to the housing and is rotatable relative to the housing,
the damping stopper includes:
 a metal fitting held on a first one of the end surface portions;
 an elastic body connected to the metal fitting; and
 a slide structure connected to the elastic body,
the slide structure is entirely flat plate-shaped,
the slide structure is contactable with and separable from a second one of the end surface portions, and the slide structure is slidable and rotatable relative to the second one of the end surface portions when the shaft is rotated in a state where the slide structure contacts the second one of the end surface portions,
a portion of the elastic body does not overlap with the metal fitting in an axial direction of the shaft,
the slide structure includes a through hole, and
a surface of the elastic body is disposed inside the through hole of the slide structure.

* * * * *